United States Patent [19]

Ketels

[11] Patent Number: 4,674,151

[45] Date of Patent: Jun. 23, 1987

[54] METHOD FOR DEBONING MEAT

[75] Inventor: Gerardus H. J. Ketels, Grave, Netherlands

[73] Assignee: Protecon B. V., Oss, Netherlands

[21] Appl. No.: 805,622

[22] Filed: Dec. 6, 1985

Related U.S. Application Data

[62] Division of Ser. No. 486,948, Mar. 8, 1983, Pat. No. 4,594,751.

[30] Foreign Application Priority Data

Jul. 15, 1981 [NL] Netherlands ................... 8103360
Jan. 11, 1982 [NL] Netherlands ................... 8200076

[51] Int. Cl.$^4$ ............................................. A22C 17/04
[52] U.S. Cl. ................................... 17/46; 17/1 G
[58] Field of Search .................... 17/1 G, 46, 11

[56] References Cited

U.S. PATENT DOCUMENTS

| | | | |
|---|---|---|---|
| 2,897,536 | 8/1959 | Bergstrom et al. | 17/1 G |
| 4,137,605 | 2/1979 | van Rij et al. | 17/46 |
| 4,402,112 | 6/1983 | Gasbarro | 17/46 X |
| 4,577,369 | 3/1986 | Langen et al. | 17/46 |

Primary Examiner—Willie G. Abercrombie
Attorney, Agent, or Firm—Harness, Dickey & Pierce

[57] ABSTRACT

A method and a device for deboning meat such as hams and shoulders, by bringing them under pressure in a press while allowing sideways escape for the meat transversely to the pressing direction, so that by the pressure the meat is loosened from the bones and moves sideways while the bones are retained between the opposite cooperating pressing surfaces at least one of said cooperating pressing surfaces (9) having means (10) conforming in shape to the shape of the bones. Preferably said pressing surface has a recess (10) substantially conforming to the shape of the bones, while said pressing surface is of an elastically deformable material and is supported in the press while leaving a free space between it and its support, so that the elastically deformable material enters this free space when being deformed by the bones in the meat during pressing, said recess may have a total volume about equal to the volume of the bone(s) in the meat, but a depth in the pressing direction smaller than the thicker parts of the bones, and an extension perpendicular to the pressing direction wider than the width of the bones in the same direction.

8 Claims, 9 Drawing Figures

METHOD FOR DEBONING MEAT

This is a division of application Ser. No. 486,948, filed Mar. 8, 1983, now U.S. Pat. No. 4,594,751, issued June 17, 1986.

This invention relates to a method and a device for deboning meat such as hams, shoulders and legs of animals and poultry by bringing them under pressure in a press while allowing a sideways escape for the meat transversely to the pressing direction, so that by the pressure the meat is loosened from the bones and moves sideways while the bones are retained between the opposite cooperating pressing surfaces, after which the said meat is removed separately from the bones.

Such a method and device are known from Netherlands patent application 77.07838. Therein the meat is not degenerated in structure but is pushed away sideways in relatively large lumps and thus loosened substantially from the bones therein. This is a method different from what happens in the so-called bone presses, in which bones and meat are compressed in a closed space under high pressure, the meat being thereby transformed into a paste-like condition, so that it can leave the space throught small openings. Such bone presses are often used for reclaiming meat remnants still attached to the bones after they have been obtained by deboning e.g. by hand, or for obtaining meat from small animals with a lot of relatively small bones such as poultry and fish.

The invention aims at improving such known deboning methods and devices in order to obtain a more complete removal of meat from the bones with less damage to the meat and less crushing of the bones at relatively low pressures.

To this end a method according to the invention as indicated in the preamble above is characterized in that at least one of the cooperating pressing surfaces has means conforming in shape to the shape of the bones.

This means that at the end of the pressing operation the bones find a space between the pressing surfaces so that on the one hand they are not crushed between these surfaces and on the other hand these surfaces can contact each other in all zones where there is no bone between them so that the meat is more completely pushed out. This gives a high yield of meat which no bone splitters and, for a good taste, no bone narrow is present. On the other hand a considerable part of the connective tissue, by which the meat is connected to the bones, remains with the bones and is thus separated from the meat.

There are in essence two different ways to apply the invention, one being the use of a pressing surface with a recess substantially conforming to the shape of the bones, the other being to apply an elastically deformable press platen which adapts itself to the shape of the bones during pressing, but both ways may be combined.

The invention thus relates to methods and devices based on both possibilities, as will become clear from the following description of the drawings and from the attached claims. Said drawings give several preferred embodiments of a device according to the invention and in said drawings:

Figure 1:
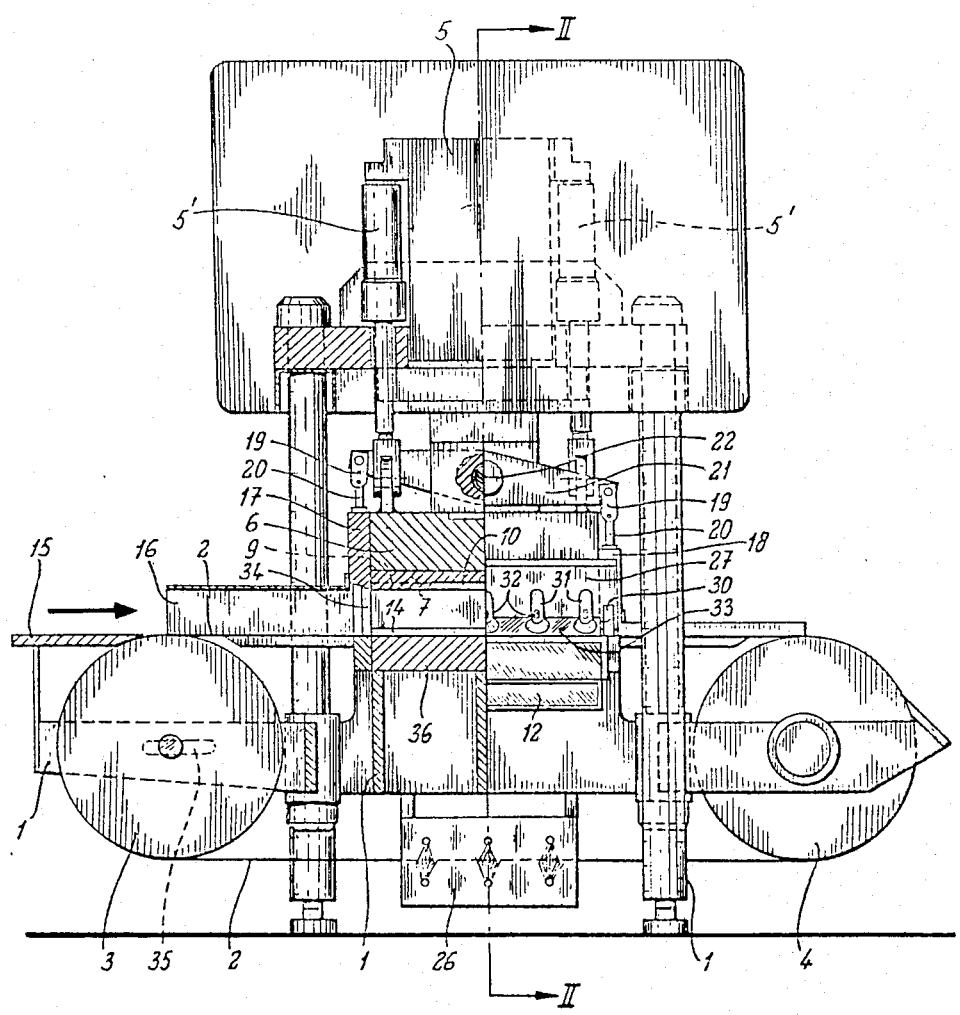
FIG. 1 is a vertical section at the left and elevation at the right of a vertically operating press device according to the invention in a first embodiment.

The device shown in FIG.'s 1 and 2 has a frame 1 and therein a conveyor belt 2 guided over endrollers 3 and 4, with a drive for roller 4 not shown. The belt may be a metal belt or a belt from rubber or the like with reinforcements therein and has a roughened top surface, e.g. constituted by a considerable numbers of small holes therein, to entrain the meat by friction.

The frame 1 carries two pressing cylinders 5 adapted to move an upper press platen 6 up and down.

Figure 3:
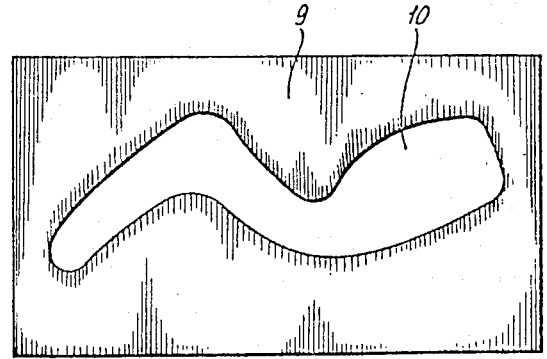
FIG. 3 is a view of a detail of this device.

The platen 6 has a pressing body 7 of an elastic plastics material, e.g. massive polyurethane with a hardness of preferably between 60° and 100° shore, e.g. and most preferably of about 90° shore, with which good results have been obtained. This body 7 preferably protrudes somewhat below the lower edge of metal side pieces 8 on the platen 6. As this material as well as synthetic rubber, which may also be used therefor, on deformation maintain a substantially constant volume, it would have to bulge out sideways when nestling around a bone in the meat to be pressed. As this is disadvantageous, it is avoided here so as to improve pressing and discharge of meat by providing a recess 10 in a plate 9 in platen 6. The elastic material of body 7 may thus bulge out into this recess 10 during pressing. Preferably recess 10 has a shape adapted to the shape of the bone or bones in the pieces of meat to be pressed and FIG. 3 gives a possible shape for said throughgoing recess 10.

Figure 2:
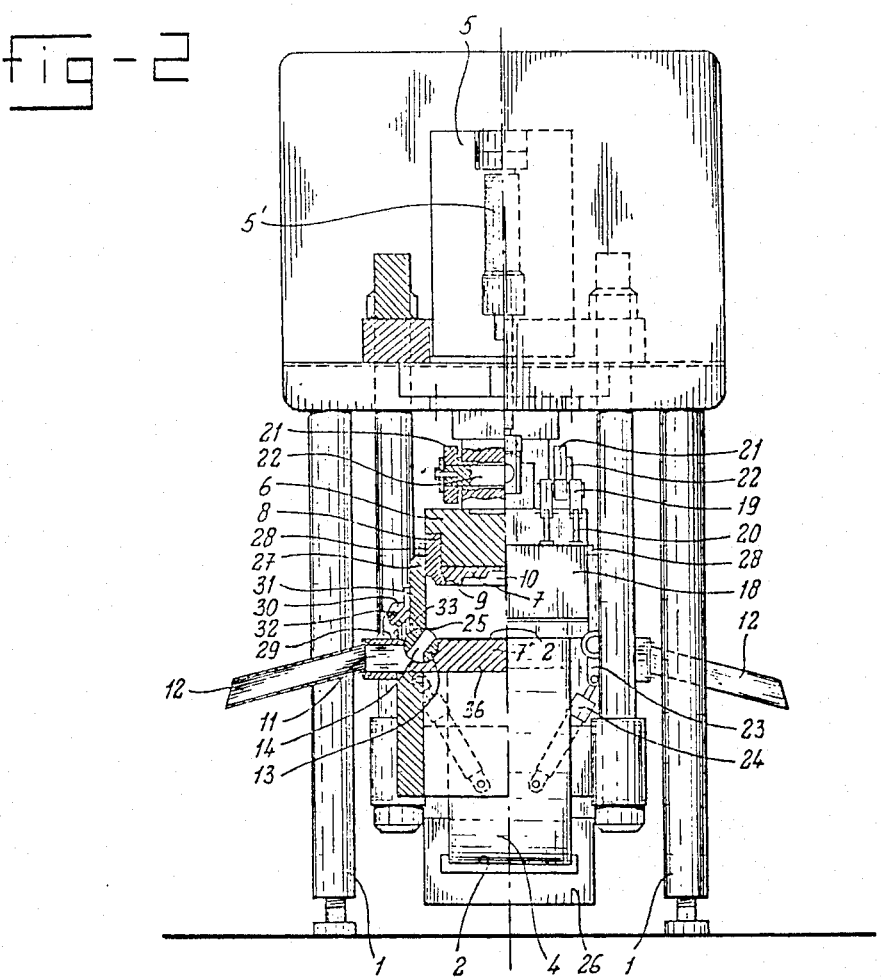
FIG. 2 is a vertical section of the device of FIG. 1 along the line II—II in FIG. 1 in the left part, and an elevation from the outside as seen in the same direction in the right part.

If desired a similar elastic body may be provided below the lower pressing surface in the table and in view of the conveyor belt 2 this is only possible if this belt is allowed to follow depressions of such an elastic lower surface without harm. In FIG. 2 such a body is indicated by dot-and-dash-lines and with numeral 7' and also here there is such a plate 9' with a bulge-out recess 10'.

The pressing space has at two opposite transverse ends, sectioned in FIG. 2, a wide substantially rectangular discharge 11, 12 for meat with rounded corners. There are means for allowing the passage and the cutting off of the meat, here formed by rotary valves 13 having a long throughgoing opening 14, which are rotated after pressing in a manner to be described.

The frame has a feedtable 15 onto which the meat to be treated is laid and from which it can be slid onto conveyor belt 2, and there is a casing 16 above the first part of the conveyor belt to safeguard personnel when introducing the meat.

The upper press platen 6 carries two doors 17 and 18. During pressing these close the press space along the two opposite sides thereof positioned transversely to the conveyor belt 2. Both doors are suspended from the upper press platen 6 with the aid of pivoting links 19 and rods 20 each connected through spring buffer means not shown to said doors. The links 19 are pivotably connected to a yoke 21 as a balancing lever, which has its fulcrum at 22 near its center for the connection to platen 6.

In a lifted position of a press platen 6 the doors 17 and 18 are suspended in the positions shown in FIG. 1. Meat with bone therein is now laid onto table 15 and from there slid onto conveyor belt 2. This belt is now moved to the right with its upper part, as seen in FIG. 1, the meat being entrained below the casing 16 and passing below door 17 into the pressing space. The conveyor belt is now stopped when the meat has about reached door 18, which is in a lower position and thus keeps back the meat even if the conveyor belt would move somewhat too far before stopping.

The rotating valves 13 each have a crank 23 close to door 17, engaged by a hydraulic or pneumatic cylinder 24, connected pivotally with its lower end in the frame. The valves 13 are with their openings 14 in the position of FIG. 2 when upper press platen 6 is in lifted position and during pressing.

Press platen 6 is now moved downwardly by cylinders 5. The doors 17 and 18 move downwardly together therewith and as soon as door 18 reaches the bottom of the pressing space, the yokes 21 rotate to push door 17 downwards, so that the pressing space is entirely closed before pressing begins or reaches higher pressures. The press platen 6 now moves downwards further and the rods 20 move on with the press platen, the said spring buffers taking up this movement elastically because the doors cannot move further downwards.

The elastic pressing body now compresses the meat in such a way that this meat is sheared from the bones present therein, so that this meat leaves the pressing space through the openings 14 in the valves 13 and through the discharge connections 11 and 12. The bones remain in place and at the end of the press stroke they are surrounded under pressure elastically by elastic body 7. At the end of the pressing period the cylinders 24 are operated in such a way that the valves 13 are rotated so that the upper edge 25 of their openings 14 cut off the meat very well so that this is well severed from the bones and is no more connected thereto by connecting tissue, sinews or the like. Immediately thereafter the valves 13 are rotated back to the position shown by cylinders 24. The top platen 6 is now lifted so that it returns to the position of FIG.'s 1 and 2 while lifting the doors 17 and 18 and conveyor belt 1 is now moved so that the bones can pass underneath the lower edge of door 18 to the right in FIG. 1 where these bones are discharged.

At 26 a spray cleaning device may clean the conveyor belt 2.

During pressing the elastic material of pressbody 7 and, if present of body 7', will deform while maintaining the same volume. The material thereof which is displaced by the bones in the meat can now bulge out into the free space or recess 10 and, if present, 10'.

The pressing body 7 (and 7' if present) can thus give a good pressing and a full enclosing of the bones by said body notwithstanding the fact that a rather hard elastic synthetic material is applied, of which the hardness as such gives a better pressing and loosening of the meat from the bones and less wear of the pressing body than a pressing body of soft elastic material would give.

As shown the space 10 (and 10') is formed in a plate 9 (or 9' respectively) as at throughgoing opening therein. If it is desired to treat meat e.g. with a single straight bone, with a bone with considerably deviating dimensions or with other deviations with respect to the bones system for which the plate 9 of FIG. 3 is intended as far as the shape of its opening 10 is concerned, a plate of the same outer dimensions is used but with a differently shaped opening 10. It is easy to introduce such another plate into the press for replacement of the plate present therein, in the following manner. Sidewall 27 of the pressing space at each end have a vertical guiding slot 34 (FIG. 1 leftside), in which each door 17, 18 engages with a protruding small edge 28 (upper parts visible in FIG. 2), so that these doors are guided adequately up and down. The sidewall 27 at each end have a web or tie-plate 30, connected pivotally at 29 to the frame to both sides of the meat discharge outlet 11. The walls 27 are, in the position shown, in which they enclose the pressing space above the rotary valves 13, kept in position by simple locking means such as rapidly detachable clamps or crossbars. These walls carry a number of arms 31 carrying a pressure block 33 with bolts 32. The bolts 32 extend through the arms 31 with respect to which they may be displaced and secured by nuts so that the pressure block just sealing contacts the adjacent rotary valves 13 so that this valve is more or less sealed but nevertheless allowed to rotate easily. The details thereof will be clear without further explanation.

Both for cleaning of the pressing space and adjacent parts as for replacing a plate 9 (and if desired also of an elastic pressing body 7) it is possible to unlock the walls 27 and swing them outwardly about pivots 29. This allows free outward swinging of the doors 17, 18 and it is now easily possible to slide the body 7 and the plate 9 simply in their own plane between the side pieces 8 out of and into the press platen structure, to inspect them, to clean them or to replace them by another body or plate respectively.

If there is also an elastic pressing body 7' with a plate 9' below the conveyor belt 2' it is also easily possible to replace these parts e.g. by loosening roller 3 and moving it to the right in FIG. 1 so that the conveyor belt becomes slack and can be lifted sufficiently to gain excess to said part 7' and 9' which may be positioned loosely in a recessed part of the lower table 36 of the press.

If there are only very thin bones in the meat, e.g. in larger numbers such as for complete carcasses of poultry, it is possible to choose as the opening 10, 10' in plate 9 or 9' simply a rectangular opening, preferably with rounded edges.

The spring buffers present in the structure 19, 20 for the doors 17 18 may be replaced by small hydraulic or pneumatic cylinders, so that it is possible to bring the doors downwardly to close the pressing space until they just contact the topsurface of the conveyor belt, after which those cylinders are operated to press the doors 17, 18 downwardly into sufficient pressing contact with the conveyor belt. In this case it is possible to omit the yokes 21 and to suspend the doors 17, 18 immediately from the topstructure of the rigid press platen 6. In this case the lower edges of the doors may be rather high up above the conveyor belt in the lifted position of press platen 6 and if this platen is in the lowest position, they may not even contact the conveyor belt without operation of such hydraulic or pneumatic cylinders.

Figure 4:
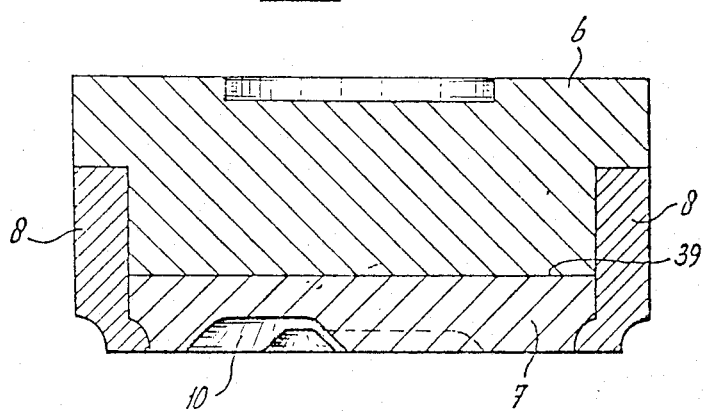
FIG. 4 shows on a larger scale in vertical section a part of the device of FIGS. 1 and 2 in a different embodiment.
Figure 5:
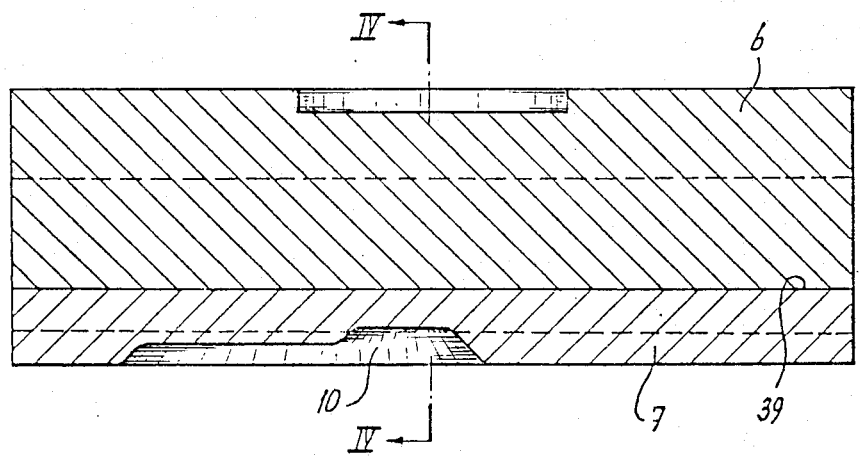
FIG. 5 is a section along the line V—V in FIG. 4 of this detail.

FIG.'s 4 and 5 show how part of the top press platen 6 of FIG.'s 1 and 2 may be embodied in a different way. FIGS. 4 and 5 correspond in sectional plane to FIG.'s 2 and 1 respectively and give on a larger scale a pressing body 7 replacing pressing body 7 of FIG.'s 1 and 2, enclosed between the body of the platen 6 itself and the side pieces 8 as described above. The body 7 may be of stainless steel, but may also be made of rubber or other elastic material with a hardness as described. This body is along its surface 39 in full contact with the body of platen 6, but if it is made of elastic material there may be a suitable recess in the lower surface of the body of the platen or there may be a separate plate with a recess as 9, 10 in FIG.'s 1 and 2.

In this case body 7 has a recess 10 in its lower surface for taking up the bones, dimensioned so as to have a volume about equal to or only somewhat greater than that of the bones but a somewhat smaller depth and a somewhat greater width. The shape of the recess roughly conforms the shape of the bones. The recess 10 may have a rather intricate shape to follow the contour and differences in thickness of the bones, particularly for pieces of meat with more than one bone, as will be described in more detail with reference to FIG.'s 6 and 7. The recess 10 has rounded corners and transitions as shown.

Figure 6:
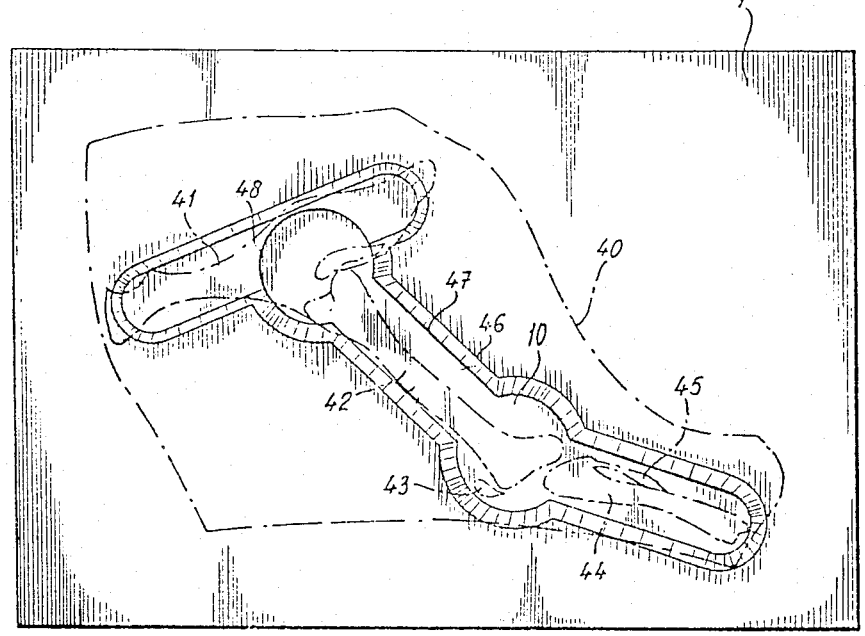
FIG. 6 shows a view of the upper pressing surface of such a device according to FIG.'s 4 and 5 in one of many possible embodiments.

FIG. 6 shows body 7 with a recess 10 for hams, the outer contour of which is indicated by dot-and-dash-line 40. The bones therein are given by dot-and-dash-lines, the os coxae is indicated by 41, the femur by 42, the patella by 43, the tibia by 44 and the fibula by 45. The outer periphery of recess 10 is indicated by 46 and as the recess has inclined edges the deeper flat bottom parts of the recess is limited to a smaller area bordered by line 47. The recess 10 may have the same depth throughout, e.g. 12 mm deep, except in the parts taking up the ends of the os coxae 41, where the recess may have a smaller depth of e.g. 8 mm and in FIG. 6 border line 48 marks the transition of deeper to narrower parts.

Figure 7:
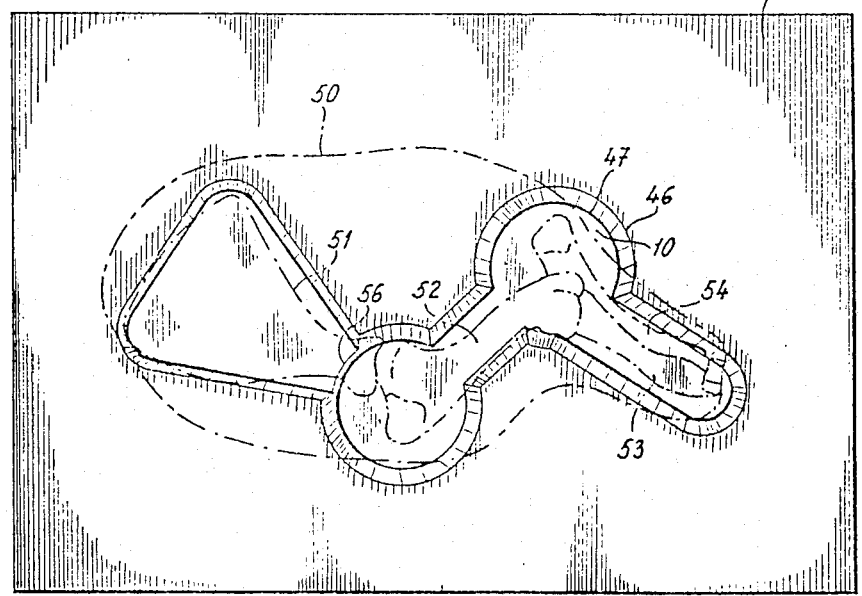
FIG. 7 shows this upper pressing surface in one of the other possible embodiments.

FIG. 7 shows a body 7 for treating shoulders. Dot-and-dash-line 50 marks the outer periphery thereof. Dot-and-dash-lines also mark the contour of the bones therein, 51 for the scapula, 52 for the humerus, 53 for the radius and 54 for the ulna. As in FIGS. 6, 46 and 47 are the border lines of recess 10, connected by inclined sides as shown in FIG.'s 4 and 5. In the area of the scapula 51, which is rather thin as compared with the other bones, the recess 10 is more shallow than in the other areas (e.g. 8 mm) and the transition between the parts of different depths is indicated by line 56.

As stated, the bones are in part thicker than the depth of the recess and this means that they are crushed somewhat at the end of the pressing cycle, but by then the recess is almost or fully closed in that body 7 contacts the lower platen or belt 2 (FIG.'s 1 and 2), so that no bone splitters can leave the recess.

Also this type of pressing bodies 7 can easily be replaced, e.g. to switch from the type of FIG. 6 to the type of FIG. 7, by swinging the side walls and doors 8, 17, 18 outwardly as described above, after which body 7 can be slid out of the press to be replaced by another one, cleaned, inspected etc.

If pressing body 7 in this case is also made of hard rubber or similar elastic material, recess 10 may have a volume somewhat smaller than the bones to remove the meat therefrom more fully without crushing them at all.

FIG.'s 8 and 9 show only the most essential parts of a pressing device according to the invention in an other embodiment, having two rollers 60 with horizontal axis. Lumps of meat with bone are supplied over supply table 61 mechanically or by hand. They thus contact the upper part of the periphery of the lower roller 60. Each roller 60 has two protruding annular parts 62 and 63 for the upper roller and 64 and 65 for the lower roller. Between these annular parts on each roller a peripheral groove is formed, of which the depth is about equal to or greater than the width. In each of these grooves a ring 66, 67 of a rather hard elastic synthetic material, e.g. massive polyurethane with a hardness of 90° shore, is provided. The ring 66 of the upper roller 60 en the ring 67 of the lower roller 60 has the same cross sectional shape and leaves a free space 68 at each side in said groove. The outer surface of each 66, 67, is not cylindrical, but is obtused-angled so that between the two rings, where they come in contact a rhomb-shaped recess 69 is formed as shown.

To the left of the rings 66, 67 and to the right thereof two different means for cutting or pinching the meat separated from the bones have been shown. At the right side the annular parts 63 and 65 contact each other in the point where the rollers 60 approach each other, so that the meat is pressed out and pinched off between them. At the left in FIG. 9 the rings 62 and 64 in this position leave a narrow space at 70 and annular part 64 carries a cutting ring 71 secured thereto, bridging the space 70.

The groove 69 may be continuous all around in the rings 66 and 67 or these rings may have a cylindrical outer surface with a number of discrete recesses, so as to form only local grooves 90 of desired shape adapted to the length and volume of the bones in the meat to be treated.

Figure 8:
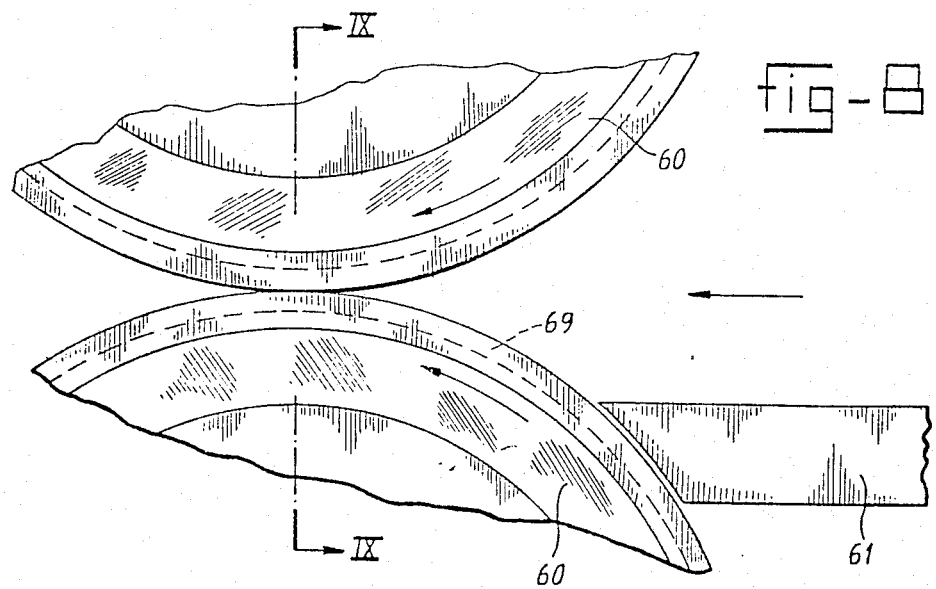
FIG. 8 shows somewhat diagrammatically the most important parts of a device according to the invention in another embodiment in horizontal view from the side.
Figure 9:
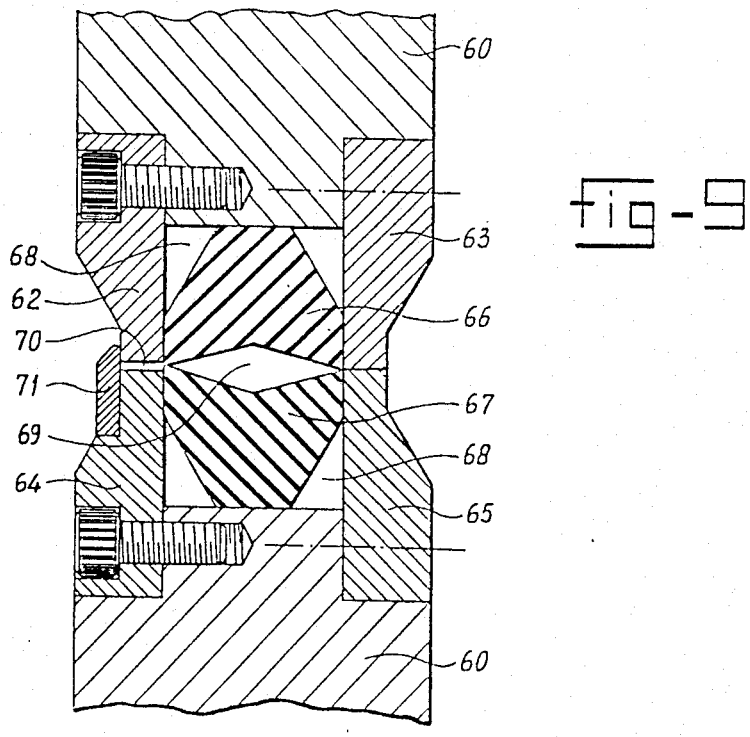
FIG. 9 shows a partial section on a larger scale of the device of FIG. 8 according to the line IX—IX in FIG. 8.
Figure 1:
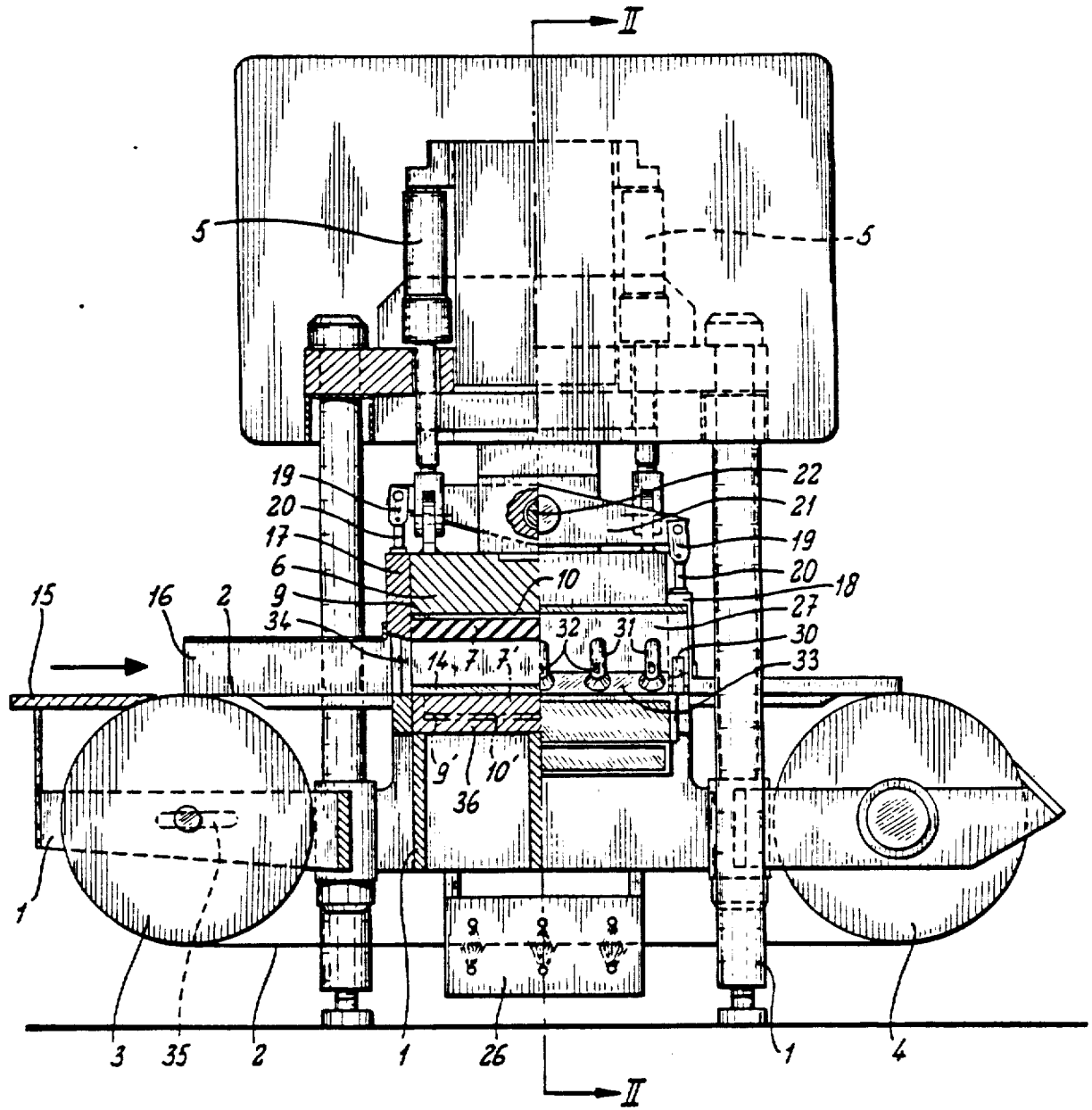
Figure 2:
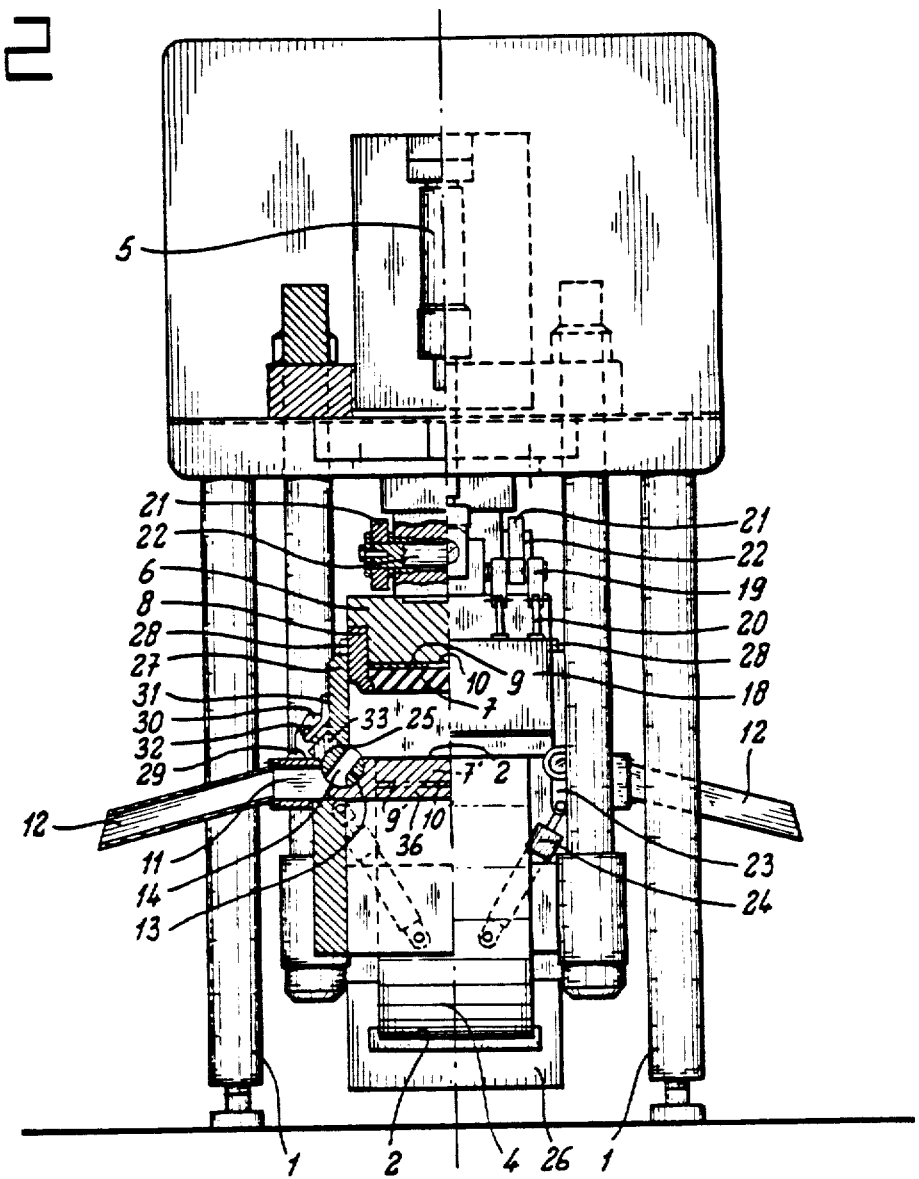
Figure 3:
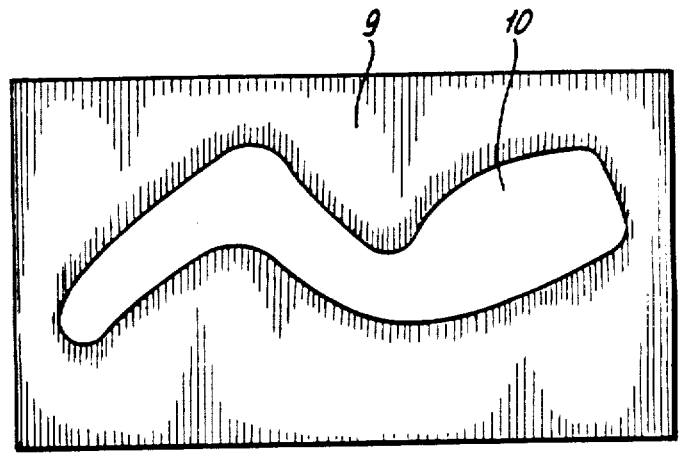

This device of FIG.'s 8 and 9 is particularly suited for lumps of meat with one or only a few substantially straight bones in line therein, such as chicken or turkey legs. The meat is supplied over feed-table 61 with the length of the bones in the plane of FIG. 8 and perpendicular to the plane of FIG. 9. The meat is entrained by the lower roller 60 to the nib between the rollers and there it is compressed so that the meat is gradually, when approaching the nib, pushed and sheared from the bones in the decreasing space between the rings 66, 67. The meat will mainly bulge out sideways as seen in FIG. 9 and it is pinched off by annular parts 63 and 65 or cut off by the cutting ring 71.

I claim:

1. The method of removing meat from a piece of bone with meat attached comprising the steps of applying a compressive force against the meat while still attached to the bone, the compressive force being applied in a direction so that the compression of the meat surrounding the perimeter of the bone in a plane perpendicular to the direction of force application and the meat around the bone is greater than the compression of the bone for shearing the meat from the bone substantially without crushing the bone, and removing the thus sheared meat from the bone.

2. The method as set forth in claim 1 wherein the meat is forced transversely relative to the direction of force application upon the application of the compressive force to the meat.

3. The method as set forth in claim 1 wherein the bone is held under a compressive force at the end of the compression of the meat for retaining the bone against movement while the final portions of meat are removed therefrom.

4. The method as set forth in claim 3 wherein the meat is removed through a valve having a cutting edge and further comprising closing the valve at the completion of the meat removal for shearing the last portions of the meat from the bone.

5. The method as set forth in claim 2 wherein the meat is compressed in a press.

6. A method according to claim 5 wherein the press has a pressing surface having a recess substantially conforming to the shape of the bones.

7. A method according to claim 5 wherein the press has a pressing surface of elastically deformable material.

8. A method according to claim 7 wherein the press has at least one press platen made of elastically deformable material supported in the press while leaving a free space between this platen and its support, so that the elastically deformable material enters this free space when being deformed by the bones in the meat during pressing.

* * * * *

UNITED STATES PATENT AND TRADEMARK OFFICE
CERTIFICATE OF CORRECTION

PATENT NO. : 4,674,151

DATED : Jun. 23, 1987

INVENTOR(S) : Gerardus H. J. Ketels

It is certified that error appears in the above-identified patent and that said Letters Patent is hereby corrected as shown below:

The sheets of drawing consisting of Figs. 1, 2 and 3, should be deleted to appear as shown on the attached sheets.

Signed and Sealed this

Sixteenth Day of May, 1989

Attest:

DONALD J. QUIGG

Attesting Officer

Commissioner of Patents and Trademarks